W. CHESTERMAN.
Evaporating Pan.
No. 31,151.
Patented Jan. 22, 1861.
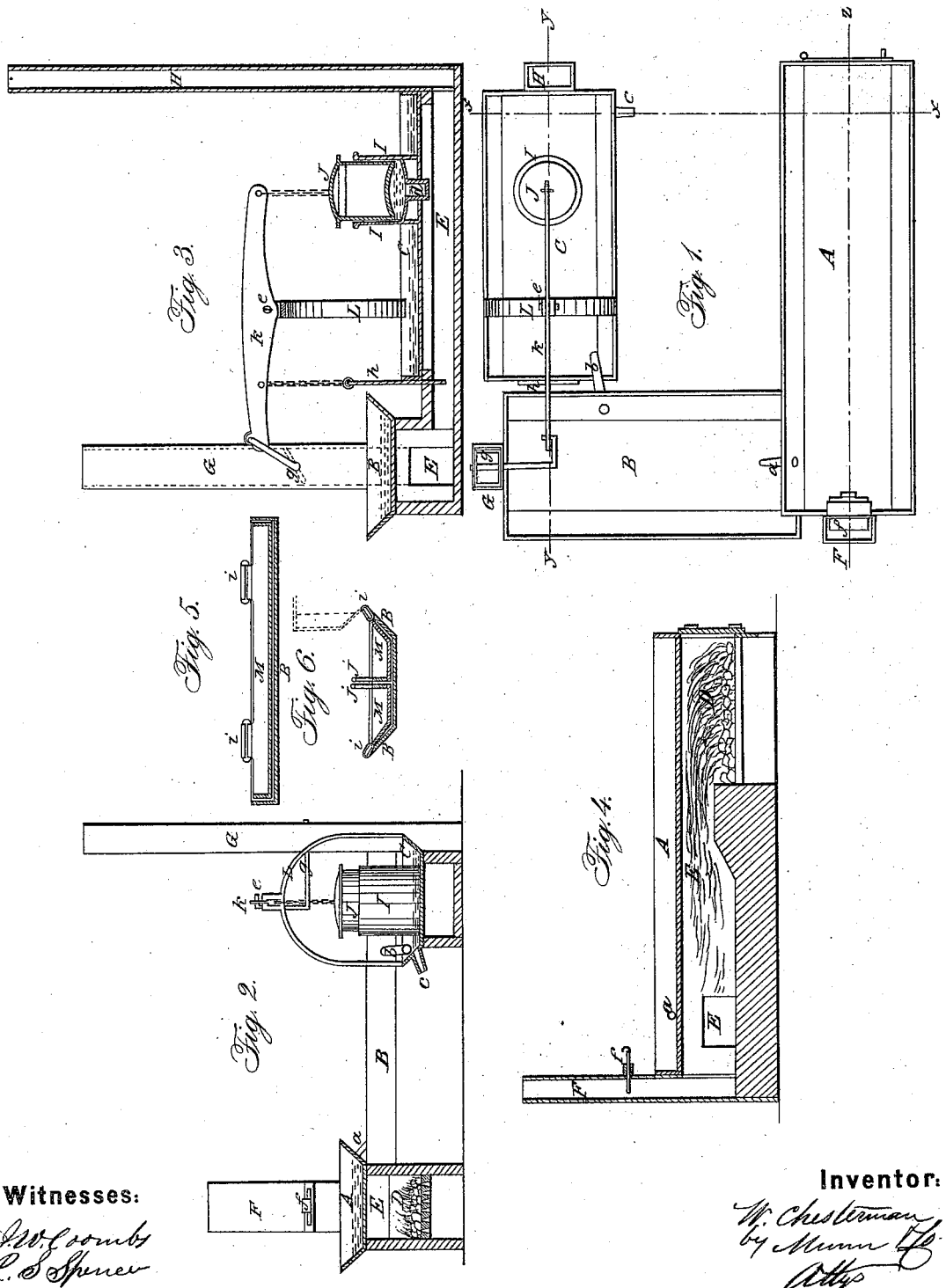
Witnesses:
J. W. Coombs
R. S. Spencer
Inventor:
W. Chesterman
by Munn & Co.
Attys

UNITED STATES PATENT OFFICE.

WM. CHESTERMAN, OF PEOSTA, IOWA.

IMPROVEMENT IN APPARATUS FOR EVAPORATING SACCHARINE JUICES.

Specification forming part of Letters Patent No. 31,151, dated January 22, 1861.

*To all whom it may concern:*

Be it known that I, W. CHESTERMAN, of Peosta, in the county of Dubuque and State of Iowa, have invented a new and Improved Apparatus for Evaporating Saccharine or other Juices or Liquors; and I do hereby declare that the following is a full, clear, and exact description of the same, reference being had to the accompanying drawings, forming part of this specification, in which—

Figure 1 is a plan view of my apparatus. Fig. 2 is a vertical section of the same in the plane indicated by the line $x\, x$ in Fig. 1. Fig. 3 is a vertical section of the same in the plane indicated by the line $y\, y$ in Fig. 1. Fig. 4 is a vertical section of the same in the plane indicated by the line $z\, z$, in Fig. 1. Figs. 5 and 6 are vertical sections at right angles to each other of an evaporating-pan.

Similar letters of reference indicate corresponding parts in the several figures.

My invention consists in a certain arrangement of a train of pans, in combination with a single continuous flue running under the whole of them and a separate chimney for each pan, and in a certain system of dampers operated by an automatic regulator applied in connection with the said arrangement of pans, flue, and chimneys, whereby I obtain a very effective and economical apparatus for evaporating and concentrating cane-juice or other saccharine or other juices or liquids.

To enable others to make and use my invention, I will proceed to describe its construction and operation.

A, B, and C are three shallow open pans arranged in any suitable horizontal relation to each other, and at such relative elevations that the contents of A may be drawn off into B by a spout, $a$, and the contents of B may be drawn off into C by a spout, $b$. The spouts $a$ and $b$ should be furnished with faucets to control the supply of juice from one pan to another. The last pan C is furnished with a spout, $c$, to draw off the concentrated and purified juice or sirup, and this spout should also be fitted with a faucet. Under the pan A is a furnace, D, from which a flue, E, passes under the pans B and C successively, said flue communicating with three separate chimneys, F, G, and H, which are arranged one at that end of each pan which is farthest from the fire in the line of the flue E, the said chimney being severally of different heights proportioned to their distance from the furnace that each may have a proper draft. The first chimney, F, is fitted with a damper, $f$, and the second, G, with a damper, $g$, and between the second chimney, G, and the third pan, C, there is a damper, $h$, in the flue E. The damper $f$ is to be worked by hand, but the dampers $g$ and $h$ are connected with an automatic regulator constructed and applied in the following manner:

I is an upright cylindrical vessel secured to the bottom of the pan C, and having a depression, $d$, in its own bottom, which enters the flue E below the said pan. This vessel has its upper end or mouth entirely open, and is partly filled with water, in which there is placed a float, J, which is suspended from one arm of a lever, K, which works on a fixed fulcrum, $e$, in a standard, L, above the pan C, and whose other arm is connected with the dampers $g$ and $h$ in such a manner that as the float J is caused to rise by the ebullition of the water in the vessel I, produced by the heat of the surrounding juice in the pan C and of the flue E below, both dampers will close, and so check the draft under the pans B and C, and as the float descends on the cessation of the ebullition of the water the dampers will open again and increase the draft. In this way the temperatures of the highly-concentrated juice or sirup in the pan C and of the less concentrated juice in the pan B are regulated, and the burning or scorching of the juice in either of said pans is prevented.

The pans A B C may be fitted with strainers in the manner shown in Figs. 5 and 6, in which B is the pan and M M are two strainers, each extending the entire length and half the width of the pan, and each hinged to the edge of its adjacent side of the pan, as shown at $i\, i$. The said strainers are of a shape to fit the sides and bottom of the pan, and have attached to their inner edges handles $j\, j$, by which they may be laid hold of for the purpose of moving them on their hinges from the position shown in black outline in Fig. 6 to that shown in red outline in the same figure, for the purpose of skimming the juice, the scum in such operation being retained in the strainers and directed over the sides of the pan into suitable receptacles, while the cleansed juice passes through their reticulated bottoms back to the pan. The raw juice is supplied to the hottest pan A, and when concentrated to a certain point is drawn off at $a$ to the pan B, where a further concentration is effected, and from whence it is drawn off at $b$ to the coolest pan C, where the concentration is finished. The use of a separate chimney at the rear end of each pan permits the regulation of the temperatures of the respective pans with great nicety. By opening wide the damper $f$ the heated products of the combustion in the furnace are caused for the most part to escape at the chimney F without passing under and heating the pans B and C, and by closing the damper $f$ more or less the products of combustion are caused to pass under the pans B and C, subject to the antomatic control of the dampers $g$ $h$ by the vessel I, float J, and lever K.

This evaporating apparatus possesses a great advantage over most other evaporating apparatus in the provision for controlling the relative temperature of the several pans and in the liability to the catching or burning of the concentrated juice being obviated. It also effects the evaporation in less time and with less fuel than is usually required, owing to the regulation of the relative temperatures being so well provided for that the fire never requires to be damped down or checked, but the boiling at a rapid rate is always kept up.

I do not claim, broadly, the regulation of chimney-dampers by the ebullition or expansion of water; but—

What I claim as my invention, and desire to secure by Letters Patent, is—

1. The arrangement of the train of pans A B C, the continuous flue E, running under the whole in succession, and a chimney at the end of each farthest from the fire, substantially as herein described.

2. The arrangement of a water-vessel, I, float J, and lever K with the pans, flues, and chimney-dampers of a sugar-evaporator, in the manner substantially as herein shown and described.

WM. CHESTERMAN.

Witnesses:
    E. G. FRENCH,
    Z. KEMPTON.